United States Patent
Ting

(10) Patent No.: US 9,268,439 B2
(45) Date of Patent: Feb. 23, 2016

(54) OPTICAL TOUCH DISPLAY PANEL PROVIDING BETTER FLEXIBILITY IN APPEARANCE DESIGN THEREOF

(75) Inventor: Kuan-Fu Ting, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 223 days.

(21) Appl. No.: 13/615,525

(22) Filed: Sep. 13, 2012

(65) Prior Publication Data

US 2013/0321344 A1     Dec. 5, 2013

(30) Foreign Application Priority Data

Jun. 1, 2012  (TW) .............................. 101119819 A

(51) Int. Cl.
*G06F 3/042* (2006.01)

(52) U.S. Cl.
CPC .................... *G06F 3/0421* (2013.01)

(58) Field of Classification Search
CPC .................................................. G06F 3/0421
USPC .......................................................... 345/175
See application file for complete search history.

(56) References Cited

U.S. PATENT DOCUMENTS

| | | | | |
|---|---|---|---|---|
| 3,673,327 | A * | 6/1972 | Johnson et al. ............ | 178/18.04 |
| 7,324,093 | B1 | 1/2008 | Gettemy et al. | |
| 8,009,944 | B2 * | 8/2011 | Shimizu ........................ | 385/32 |
| 2002/0088930 | A1 * | 7/2002 | Graham et al. .......... | 250/227.11 |
| 2003/0026971 | A1 * | 2/2003 | Inkster et al. .............. | 428/304.4 |
| 2008/0159694 | A1 * | 7/2008 | Payne .............................. | 385/33 |
| 2010/0123682 | A1 * | 5/2010 | Juni ............................... | 345/174 |
| 2010/0224758 | A1 | 9/2010 | Kuo et al. | |
| 2010/0253902 | A1 * | 10/2010 | Yamazaki et al. ............ | 349/158 |
| 2011/0122071 | A1 | 5/2011 | Powell | |
| 2011/0122075 | A1 | 5/2011 | Seo et al. | |
| 2011/0148815 | A1 * | 6/2011 | Tsai ............................... | 345/175 |
| 2011/0216042 | A1 * | 9/2011 | Wassvik et al. ............... | 345/175 |
| 2011/0227873 | A1 | 9/2011 | Chung et al. | |
| 2011/0261300 | A1 | 10/2011 | Miyazaki et al. | |

FOREIGN PATENT DOCUMENTS

| | | |
|---|---|---|
| CN | 101738685 | 6/2010 |
| TW | 200935283 | 8/2009 |
| TW | 201122629 | 7/2011 |

OTHER PUBLICATIONS

"Office Action of Taiwan Counterpart Application", issued on May 12, 2014, p. 1-p. 6.
"Office Action of Chinese Counterpart Application", issued on Sep. 29, 2015, p1-p8, in which the listed reference was cited.

* cited by examiner

*Primary Examiner* — Kwang-Su Yang
(74) *Attorney, Agent, or Firm* — Jianq Chyun IP Office

(57) ABSTRACT

An optical touch display panel includes a supporting substrate, a flexible display panel, a transparent elastomer, at least one light emitting element and at least one sensing element. The flexible display panel is disposed above the supporting substrate. The transparent elastomer is disposed between the supporting substrate and the flexible display panel. The light emitting element is disposed beside a first side of the transparent elastomer and adapted to provide a light toward the transparent elastomer. The sensing element is disposed beside a second side of the transparent elastomer. The light is transmitted through the transparent elastomer to between the supporting substrate and the flexible display panel to define a sensing space.

13 Claims, 4 Drawing Sheets

OPTICAL TOUCH DISPLAY PANEL PROVIDING BETTER FLEXIBILITY IN APPEARANCE DESIGN THEREOF

CROSS-REFERENCE TO RELATED APPLICATION

This application claims the priority benefit of Taiwan application serial no. 101119819, filed on Jun. 1, 2012. The entirety of the above-mentioned patent application is hereby incorporated by reference herein and made a part of this specification.

BACKGROUND OF THE INVENTION

1. Field of the Invention

The present invention relates to a touch display panel, and more particularly, to an optical touch display panel.

2. Description of Related Art

Current touch display panels can be generally classified into resistive, capacitive, optical, surface acoustic wave and electromagnetic types depending upon their design. Among all these types of touch display panels, the optical touch display panels have become a new round of development trend.

In general, optical touch display panels typically include a display panel and an optical touch control module disposed in front of the display panel. When a touch object touches the display panel, the optical touch module determines a position of the touch object according to light blocking and a change in light intensity caused by the touch object. A light source and a light guide unit for guiding the light source are disposed on a front frame beside the display surface. This causes the structure beside the display surface to be unduly protrusive, which results in a poor appearance of the display panel and a lack of modern feeling of flatness. Therefore, increasing the degree of integration between the optical touch control module and the display panel has been an important subject to research for optical touch display panels.

SUMMARY OF THE INVENTION

Accordingly, the present invention is directed to an optical touch display panel in which the position of a touch point is calculated according to light blocking and the change in light intensity.

The embodiment of the present invention provides an optical touch display panel. The optical touch display panel includes a supporting substrate, a flexible display panel, a transparent elastomer, at least one light emitting element and at least one sensing element. The flexible display panel is disposed above the supporting substrate. The transparent elastomer is disposed between the supporting substrate and the flexible display panel and includes a first side and a second side opposite to each other. The light emitting element is disposed beside the first side of the transparent elastomer. The light emitting element is adapted to provide a light toward the transparent elastomer. The sensing element is disposed beside the second side of the transparent elastomer. The light is transmitted through the transparent elastomer to between the supporting substrate and the flexible display panel to define a sensing space.

In one embodiment, a material of the supporting substrate includes glass, plastic or metal.

In one embodiment, the flexible display panel includes a flexible liquid crystal display panel, a flexible electrophoretic display panel, or a flexible organic electroluminescence display panel.

In one embodiment, a shape of the transparent elastomer includes a closed annular shape.

In one embodiment, a material of the transparent elastomer includes resin or synthetic rubber.

In one embodiment, the transparent elastomer includes a plurality of transparent elastomer units, and the transparent elastomer units are dispersedly arranged between the supporting substrate and the flexible display panel.

In one embodiment, the light emitting element is an invisible light source, and the light is an invisible light.

In one embodiment, the invisible light source includes an infrared light source.

In one embodiment, the sensing element is an invisible light sensing element.

In one embodiment, the sensing element is an infrared light sensing element.

In one embodiment, the light emitting element is a visible light source, and the light is a visible light.

In one embodiment, the sensing element is a visible light sensing element.

In one embodiment, the light emitting element includes a light emitting diode.

In one embodiment, the sensing element includes a complementary metal oxide semiconductor sensing element or a charge-coupled device.

In one embodiment, when the flexible display panel is touched by at least one touch object, the touch object causes both a touch concave point and a protruding portion corresponding to the touch concave point at a touch position of the flexible display panel, the protruding portion enters the sensing space thus blocking the light, and the sensing element senses a change in the light caused by the protruding portion, and, based on the change in the light caused by the protruding portion, determines the position of the protruding portion in the sensing space.

In view of the foregoing, the light emitting element of the embodiment of the present invention is disposed between the supporting substrate and the flexible display panel, and the light emitted by the light emitting element may be transmitted through the transparent elastomer to between the supporting substrate and the flexible display panel to define the sensing space. Therefore, in comparison with the conventional infrared type touch display panel, the optical touch display panel of the present invention is not required to preserve an infrared light path above the display panel, thus providing better flexibility in appearance design thereof.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

Figure 1A:
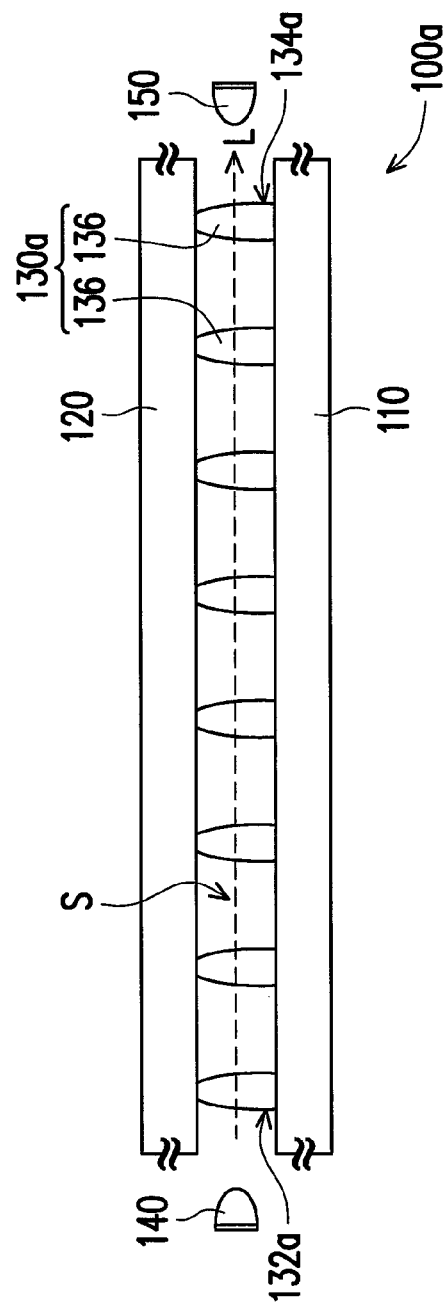
FIG. 1A is a cross-sectional view of an optical touch display panel according to one embodiment of the present invention.

FIG. 1A is a cross-sectional view of an optical touch display panel according to one embodiment of the present invention. Referring to FIG. 1A, in the present embodiment, the optical touch display panel 100a includes a supporting substrate 110, a flexible display panel 120, a transparent elastomer 130a, at least one light emitting element 140 and at least one sensing element 150.

Specifically, the flexible display panel 120 is disposed above the supporting substrate 110. The material of the supporting substrate 110 includes, but not limited to, for example, glass, plastic or metal. The flexible display panel 120 includes, but not limited to, for example, a flexible liquid crystal display panel, a flexible electrophoretic display panel, or a flexible organic electroluminescence display panel.

The transparent elastomer 130a is disposed between the supporting substrate 110 and the flexible display panel 120. The transparent elastomer 130a includes a first side 132a and a second side 134a that are opposite to each other. In this embodiment, the transparent elastomer 130a includes a plurality of transparent elastomer units 136 and the transparent elastomer units 136 are dispersedly arranged (e.g. arranged in an array as shown in FIG. 1C or arranged in an irregular fashion) between the supporting substrate 110 and the flexible display panel 120. The first side 132a and the second side 134a of the transparent elastomer 130a are defined by the transparent elastomer units 136 arranged at opposite ends of the supporting substrate 110 and the flexible display panel 120. The material of the transparent elastomer 130a includes, but not limited to, for example, resin or synthetic rubber.

The light emitting element 140 is disposed beside the first side 132a of the transparent elastomer 130a and adapted to provide a light L toward the transparent elastomer 130a. The sensing element 150 is disposed beside the second side 134a of the transparent elastomer 130a. That is, the light emitting element 140 and the sensing element 150 are located below the flexible display panel 120, and the light emitting element 140 and the sensing element 150 are arranged, for example, horizontally. In particular, the light L can be transmitted through the transparent elastomer 130a to between the supporting substrate 110 and the flexible display panel 120 to define a sensing space S. Here, taking an infrared light as an example, the light emitting element 140 is an infrared light source, for example, an infrared light emitting diode, and the light L is an infrared light. The sensing element 150 is an infrared light sensing element, and the infrared light sensing element includes, but not limited to, a complementary metal oxide semiconductor (CMOS) sensing element or a charge-coupled device (CCD).

Notably, in the present embodiment, the light emitting element 140 may be an invisible light source. The invisible light source is, for example, an invisible light emitting diode and the light L is an invisible light. In this case, the sensing element 150 may be an invisible light sensing element and the invisible light sensing element includes, but not limited to, for example, a CMOS sensing element or a CCD. In other embodiments, however, the light emitting element 140 may also be a visible light source. The visible light source is, for example, a visible light emitting diode, and the light L may be a visible light. In this case, the sensing element 150 may also be a visible light sensing element, and the invisible light sensing element includes, but not limited to, for example, a CMOS sensing element or a CCD.

Figure 1B:
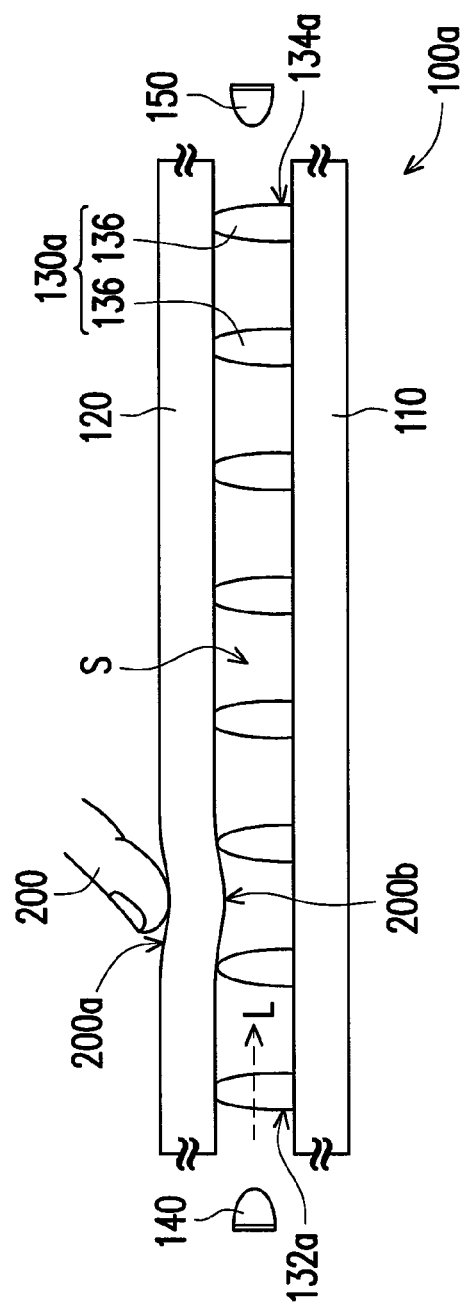
FIG. 1B is a cross-sectional view illustrating a touch object touching the optical touch display panel of FIG. 1A.
Figure 1C:
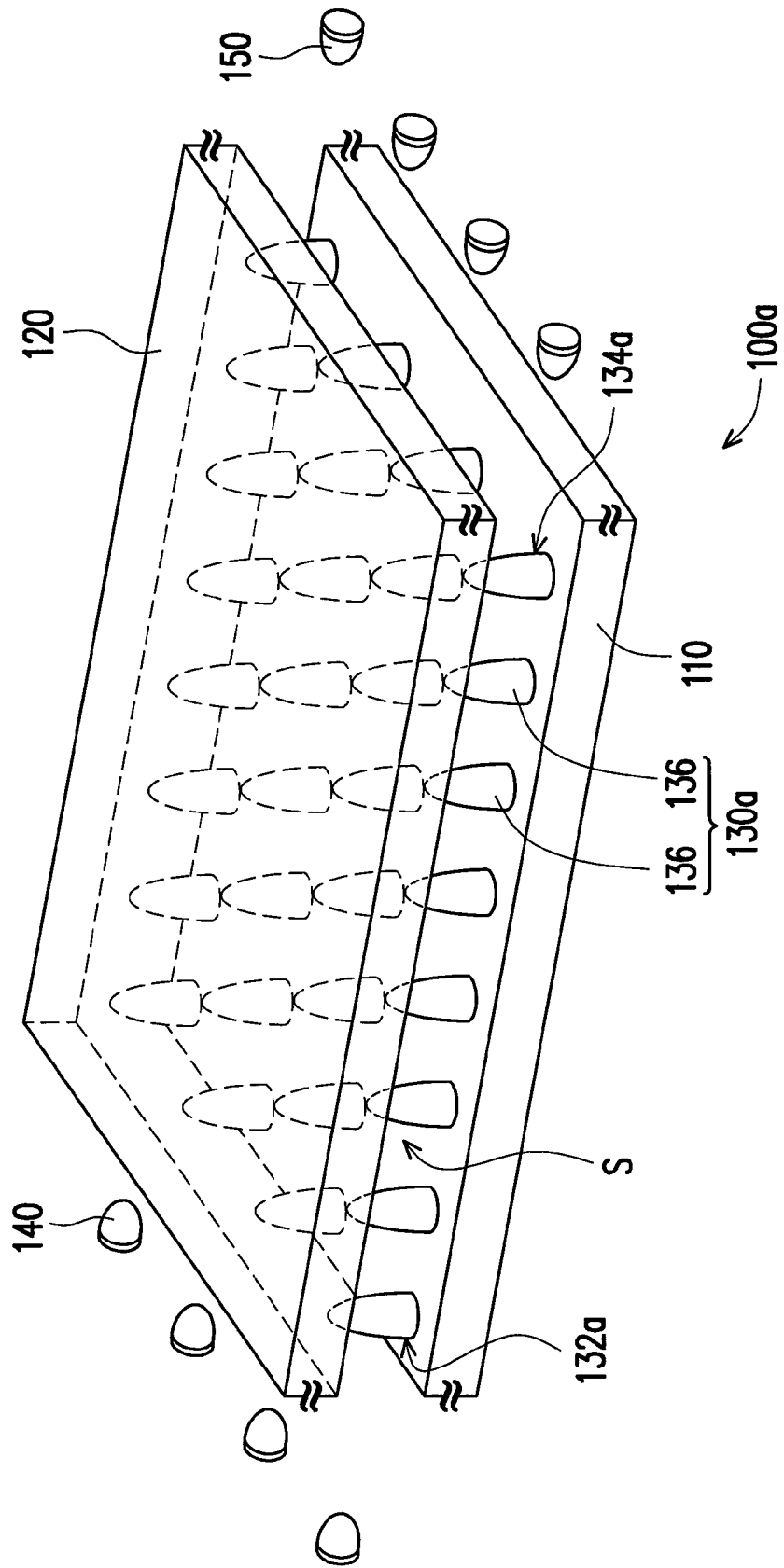
FIG. 1C is a three-dimensional view of the optical touch display panel of FIG. 1A.

FIG. 1B is a cross-sectional view illustrating a touch object touching the optical touch display panel of FIG. 1A. Referring to FIG. 1B, when the flexible display panel 120 is touched by at least one touch object 200, because the flexible display panel 120 has elasticity, the touch object 200 can cause both a touch concave point 200a and a protruding portion 200b corresponding to the touch concave point 200a at a touch position of the flexible display panel 120. At this time, the protruding portion 200b enters the sensing space S thus blocking the light L, and the sensing element 150 senses the change in the light L caused by the protruding portion 200b. More specifically, the protruding portion 200b enters the sensing space S and blocks the transmission of the light L in the sensing space S, thus causing the light change in the sensing space S. Therefore, the sensing element 150 detects the change in the light that is blocked by the protruding portion 200b and, based on this light change, determines the position of the protruding portion 200b in the sensing space S. A control module (not shown) then performs signal processing to calculate the position of the touch object 200 relative to the flexible display panel 120.

Because the light emitting element 140 of the present embodiment is disposed between the supporting substrate 110 and the flexible display panel 120, and the light L emitted by the light emitting element 140 may be transmitted through the transparent elastomer 130a to between the supporting substrate 110 and the flexible display panel 120 to define the sensing space S. In comparison with the conventional infrared type touch display panel, the optical touch display panel 100a of the present embodiment is not required to preserve an infrared light path above the display panel, thus providing better flexibility in appearance design thereof.

Figure 2A:
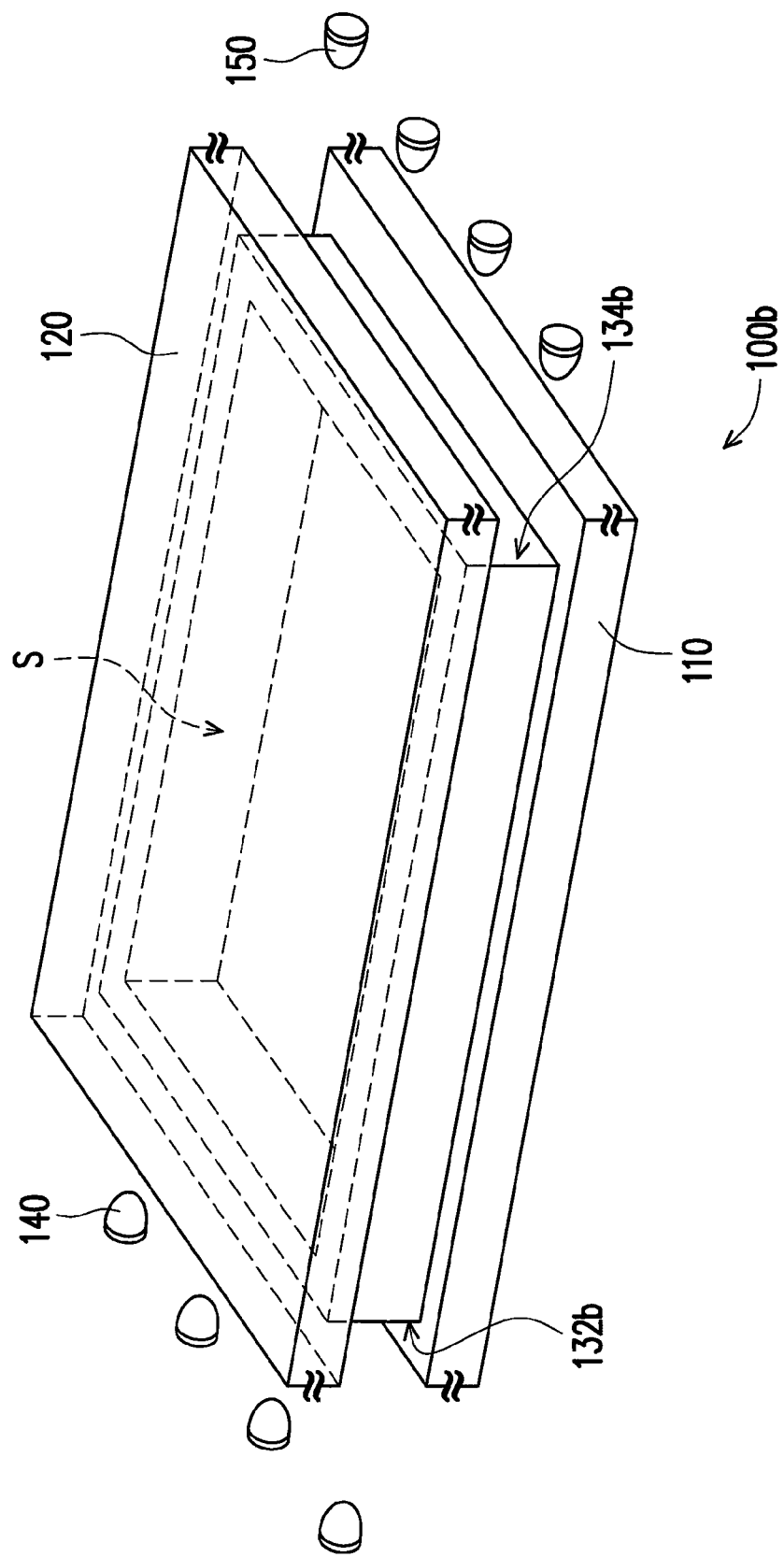
FIG. 2A is a three-dimensional view of an optical touch display panel according to another embodiment of the present invention.
Figure 2B:
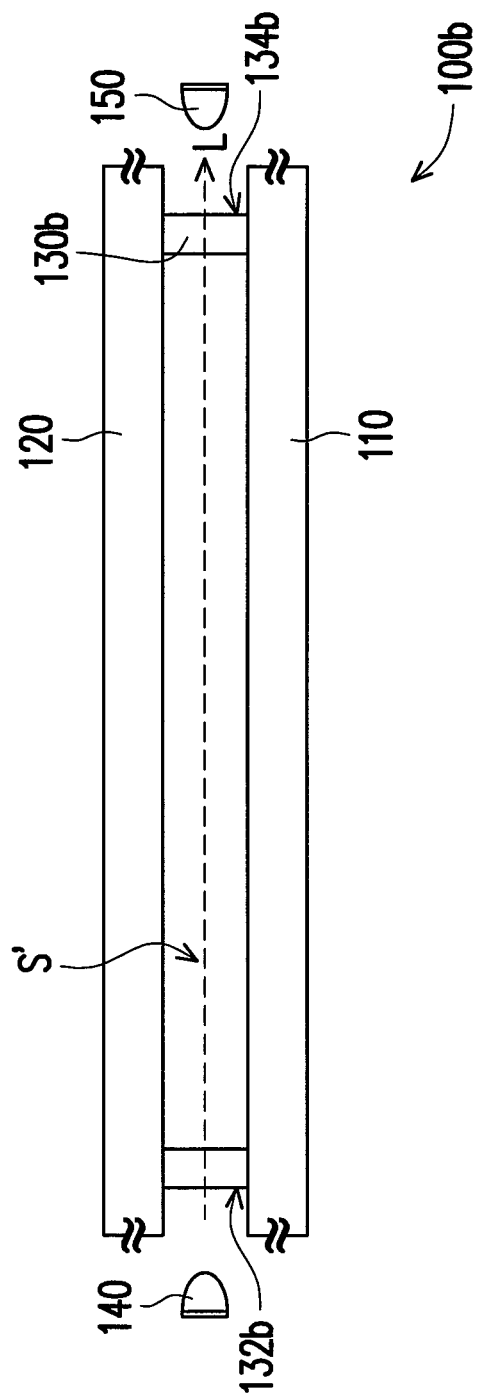
FIG. 2B is a cross-sectional view of the optical touch display panel of FIG. 2A.

Notably, while the transparent elastomer 130a mentioned above is exemplarily illustrated as including the plurality of transparent elastomer units 136, the present embodiment does not limit the transparent elastomer 130a to any particular form. In other embodiments, however, referring to FIG. 2A and FIG. 2B, the transparent elastomer 130b of the optical touch display panel 100b may also be a continuous structure that is integrally formed. The shape of the transparent elastomer 130b may be the closed annular shape, and the transparent elastomer 130b is disposed at a periphery of the supporting substrate 110 and the flexible display panel 120, and the first side 132b and the second side 134b of the transparent elastomer 130b are opposite to each other. Alternatively, another structure that can equally maintain a gap between the flexible display panel 120 and the supporting substrate 110 can be adopted without departing the scope of the present invention.

In summary, the light emitting element of the present invention is disposed between the supporting substrate and the flexible display panel, and the light emitted by the light emitting element may be transmitted through the transparent elastomer to between the supporting substrate and the flexible display panel to define the sensing space. Therefore, when the flexible display panel is touched by at least one touch object, the touch object can cause both a touch concave point and a protruding portion corresponding to the touch concave point at a touch position of the flexible display panel. The protruding portion enters the sensing space thus blocking the light, and the sensing element senses the change in the light caused by the protruding portion and, based on this light change, determines the position of the protruding portion in the sensing space. The control module then performs signal processing to calculate the position of the touch object relative to the flexible display panel. In comparison with the conventional infrared type touch display panel, the optical touch display panel of the present invention is not required to preserve an infrared light path above the display panel, thus providing better flexibility in appearance design thereof.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical touch display panel comprising:
   a supporting substrate;
   a flexible display panel disposed above the supporting substrate;
   a transparent elastomer disposed between the supporting substrate and the flexible display panel and comprising a first side and a second side opposite to each other, wherein the transparent elastomer comprises a plurality of transparent elastomer units, and the transparent elastomer units are dispersedly arranged between the supporting substrate and the flexible display panel, and an upper surface and a bottom surface of each of the transparent elastomer units lean against the flexible display panel and the supporting substrate, respectively;
   at least one light emitting element disposed an outer sides of the first side of the transparent elastomer, the light emitting element adapted to provide a light toward the transparent elastomer; and
   at least one sensing element disposed an outer sides of the second side of the transparent elastomer, wherein the light emitting element and the sensing element are located near an edge of the supporting substrate and an edge of the flexible display panel, and the light is transmitted through the transparent elastomer between the supporting substrate and the flexible display panel to define a sensing space.

2. The optical touch display panel according to claim 1, wherein a material of the supporting substrate comprises glass, plastic or metal.

3. The optical touch display panel according to claim 1, wherein the flexible display panel comprises a flexible liquid crystal display panel, a flexible electrophoretic display panel, or a flexible organic electroluminescence display panel.

4. The optical touch display panel according to claim 1, wherein a material of the transparent elastomer comprises resin or synthetic rubber.

5. The optical touch display panel according to claim 1, wherein the light emitting element is an invisible light source, and the light is an invisible light.

6. The optical touch display panel according to claim 5, wherein the invisible light source comprises an infrared light source.

7. The optical touch display panel according to claim 1, wherein the sensing element is an invisible light sensing element.

8. The optical touch display panel according to claim 7, wherein the sensing element comprises an infrared light sensing element.

9. The optical touch display panel according to claim 1, wherein the light emitting element is a visible light source, and the light is a visible light.

10. The optical touch display panel according to claim 1, wherein the sensing element is a visible light sensing element.

11. The optical touch display panel according to claim 1, wherein the light emitting element comprises a light emitting diode.

12. The optical touch display panel according to claim 1, wherein the sensing element comprises a complementary metal oxide semiconductor sensing element or a charge-coupled device.

13. The optical touch display panel according to claim 1, wherein, when the flexible display panel is touched by at least one touch object, the touch object causes both a touch concave point and a protruding portion corresponding to the touch concave point at a touch position of the flexible display panel, the protruding portion enters the sensing space thus blocking the light, and the sensing element senses a change in the light caused by the protruding portion and, based on the change in the light caused by the protruding portion, determines a position of the protruding portion in the sensing space.

* * * * *